US007990475B1

(12) United States Patent
Sarangi et al.

(10) Patent No.: US 7,990,475 B1
(45) Date of Patent: Aug. 2, 2011

(54) METHODS AND APPARATUS FOR AUTOMATED REPRESENTATIVE IMAGE SELECTION

(75) Inventors: Ayusman Sarangi, UttarPradesh (IN); Harshdeep Singh, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 1366 days.

(21) Appl. No.: 11/515,677

(22) Filed: Sep. 5, 2006

(51) Int. Cl.
  *H04N 5/14* (2006.01)
  *H04N 7/32* (2006.01)
(52) U.S. Cl. ..... 348/699; 348/700; 348/701; 348/413.1; 348/430.1; 382/236; 375/240.16
(58) Field of Classification Search .................. 348/451, 348/452, 620, 699, 700, 701, 413.1, 430.1; 382/236, 275; 375/240.16, 240.01
See application file for complete search history.

(56) References Cited

U.S. PATENT DOCUMENTS

7,545,957 B2 * 6/2009 Cornog et al. ................ 382/107
2010/0054338 A1 * 3/2010 Suzuki et al. ............ 375/240.16
* cited by examiner

*Primary Examiner* — Jefferey Harold
*Assistant Examiner* — Jean W Désir
(74) *Attorney, Agent, or Firm* — Kilpatrick Townsend & Stockton LLP (57) ABSTRACT

A system determines a plurality of frames. The plurality of frames is a subset of a set of frames comprising at least a portion of a video clip. The frames are candidates to represent the set of frames. The system calculates a motion vector for each of the frames within the plurality of frames. The motion vector indicates an amount of motion in each of the frames with respect to at least one other frame from the plurality of frames. The system assesses a strength value for each of the frames. The strength value indicates an assessment of pictorial quality of each of the frames. The system selects a representative frame from the plurality of frames based on the motion vector and strength value. The representative frame indicates a most favorable representation of the plurality of frames.

20 Claims, 8 Drawing Sheets

| 145-1 | 145-2 | 145-3 | 145-4 | 145-5 | 145-6 | 145-7 | 145-8 | 145-9 | 145-10 |

214 CALCULATE A MOTION VECTOR FOR EACH OF THE FRAMES WITHIN THE PLURALITY OF FRAMES, THE MOTION VECTOR INDICATING AN AMOUNT OF MOTION IN EACH OF THE FRAMES WITH RESPECT TO AT LEAST ONE OTHER FRAME FROM THE PLURALITY OF FRAMES

215 IDENTIFY AT LEAST ONE OBJECT IN AT LEAST ONE FRAME WITHIN THE PLURALITY OF FRAMES

216 DETERMINE THE AT LEAST ONE OBJECT IS NOT INDICATIVE OF THE MOST FAVORABLE REPRESENTATION OF THE PLURALITY OF FRAMES

217 DETERMINE THE AT LEAST ONE OBJECT IS NOT INCLUDED IN A SET OF COMMON OBJECTS SHARED BY A COLLECTION OF FRAMES WITHIN THE PLURALITY OF FRAMES, THE SET OF COMMON OBJECTS ASSOCIATED WITH THE MOST FAVORABLE REPRESENTATION OF THE PLURALITY OF FRAMES

218 DETERMINE THE AT LEAST ONE FRAME DOES NOT QUALIFY FOR THE SELECTION OF THE REPRESENTATIVE FRAME

227 SELECT A REPRESENTATIVE FRAME FROM THE PLURALITY OF FRAMES BASED ON THE MOTION VECTOR AND STRENGTH VALUE

228 SELECT A FRAME FROM THE PLURALITY OF FRAMES, THE FRAME HAVING A LARGEST STRENGTH VALUE

229 DETERMINE AT LEAST TWO FRAMES HAVE A LARGEST STRENGTH VALUE

230 SELECT THE REPRESENTATIVE FRAME FROM THE AT LEAST TWO FRAMES, THE REPRESENTATIVE FRAME SELECTED BASED ON A SEQUENCE OF THE FRAMES WITHIN THE SET OF FRAMES COMPRISING THE AT LEAST A PORTION OF A VIDEO CLIP

*FIG. 8*

METHODS AND APPARATUS FOR AUTOMATED REPRESENTATIVE IMAGE SELECTION

BACKGROUND

Conventional computerized devices, such as personal computers, laptop computers, and the like utilize graphical user interfaces in applications, such as operating systems, and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The graphical objects are often represented as icons, and the user can operate an input device such as a mouse to move a mouse pointer onto an icon (i.e., graphically overlapping the icon) on the graphical user interface. By depressing a mouse button, the application (such as the operating system desktop) selects the icon, and if the user maintains the mouse button in a depressed state, the user can drag the icon across the graphical user interface. By releasing the mouse button, the icon is placed on the graphical user interface at the current position of the mouse pointer.

Using graphical user interface technology, users can create and update documents (i.e., web pages, brochures, etc) and/or projects, such as a editing a Digital Video Disk (DVD), by dragging and dropping graphical objects (i.e., video clips, etc) into the project via an authoring tool.

A DVD project is produced by linking together video clips. Video clips are comprised of a plurality of video frames. Generally, a user (creating the DVD) will select a single frame that is representative of the video clip(s) as a 'poster image' (also referred to as a 'poster frame'). The poster frame is a frame from the plurality of video frames that best represents the content of the plurality of video frames within the video clip. The user reviews the frames within a video clip (or multiple video clips), and visually assesses the frame that best represents the video clip(s). The poster image presents 'a picture is worth a thousand words' representation of the content of the DVD or video clip. In the case where a user is creating a timeline comprised of multiple video clips, each of the video clips can have its own poster image, making it easier for the user to identify each video clip while manipulating a plurality of video clips within the DVD authoring tool.

SUMMARY

Conventional technologies for selecting a poster image (i.e., a representative image) from a video clip suffer from a variety of deficiencies. In particular, conventional technologies related to automatically selecting a poster image from a video clip involve simply selecting the first frame in the video clip. The first frame may be an empty frame, a blurry frame, or a frame that doesn't properly reflect the content of the video clip. Conventional technologies related to selecting a representative image from a video clip can also rely on a user to determine the representative video clip, via the naked human eye. The user reviews each frame within the video clip (a time consuming task) to understand the content of the video clip, and then selects the representative frame. The selection of the representative frame is subjective, based on the opinion of the user making the selection. However, the representative frame selected by a user may not be the most representative frame to represent the content of the video clip.

Embodiments disclosed herein significantly overcome such deficiencies and provide a system that includes a computer system executing a representative image selecting process that selects a frame within a video clip that best represents the content of that video clip. The representative image selecting process receives, from a user, a video clip comprised of a plurality of frames. For each of the frames within the video clip, the representative image selecting process calculates a motion vector for the frame using, for example, motion estimation technique (MET), a known algorithm. The motion vector for each frame is calculated with respect to each of the two frames that are on either side of the frame within the video clip. That is, if frame number two is sandwiched between frame number one and frame number three, a motion vector is calculated for frame number two with respect to frame number one and a motion vector is calculated for frame number two with respect to frame number three. Frames that do not have two adjacent frames, such as the first frame and the last frame, are discarded or ignored.

Each frame is comprised of a plurality of pixels. The average magnitude of the motion vectors per pixel is calculated for each frame. The plurality of frames is ordered in descending order of the average magnitude of the motion vectors per. In one embodiment, a user determines a percentage of frames that should not be included within a set of frames (the set of frames that are considered to be candidates for representing the video clip as a whole). For example, the user determines that 75% of the frames, within the set of frames, should be ignored. The representative image selecting process ignores the first 75% of the plurality of frames (that are ordered in descending order of the average magnitude of the motion vectors per pixel for each frame). The frames in the remaining subset of frames (i.e., the remaining 25% of the frames with the lowest average magnitude of the motion vectors per pixel) are assessed for pictorial quality. The frames in the remaining subset of frames represent the frames within the video clip that have the least amount of motion with respect to all the frames within the video clip.

Pictorial quality for each frame is assessed via a strength value. The strength value for each frame is initialized, for example, to zero. Each frame is assessed an image sharpness value and contrast value. The image sharpness value and contrast value are added to the strength value for that frame. Each frame is assessed a noise value that is subtracted from the strength value for that frame. The frame with the highest strength value from the remaining subset of frames (i.e., the remaining 25% of the frames with the lowest average magnitude of the motion vectors per pixel) is selected as the representative frame. In the case of a tie between two or more frames, the frame (among the frames that are tied for strength value) that appears first within the timeline of the video clip is the frame that is chosen as the representative frame.

The representative image selecting process determines a plurality of frames that are candidates to represent the set of frames. The plurality of frames is a subset of a set of frames comprising at least a portion of a video clip. The representative image selecting process calculates a motion vector for each of the frames within the plurality of frames. The motion vector indicates an amount of motion in each of the frames with respect to at least one other frame from the plurality of frames. The representative image selecting process assesses a strength value (indicating an assessment of pictorial quality of each of the frames) for each of the frames, and selects a representative frame from the plurality of frames. The representative frame is selected based on the motion vector and strength value, and indicates a most favorable representation of the plurality of frames.

During an example operation of one embodiment, suppose a user needs to find a representative frame from a video clip, such as a video clip of a road race. The user inputs to the representative image selecting process the number of frames within the video clip, for example 100 frames. The video clip contains footage of runners running in the road race, spectators cheering for the runners, race officials manning the finish line, etc. The representative image selecting process ignores the first and last frames within the video clip since the first frame and the last frame do not have an adjacent frame on both sides. For each of the frames within the video clip, the representative image selecting process calculates motion vectors using, for example, a known Motion Estimation Technique (MET).

Each frame is comprised of a plurality of pixels. The representative image selecting process determines the average magnitude of motion vectors per pixel for each frame, and orders the frames within the video clip in the descending order of the average magnitude of motion vectors per pixel. The user determines a percentage of frames, within the ordered set of frames, for the representative image selecting process to ignore when selecting a representative frame from the video clip.

The representative image selecting process determines a strength value for each frame within the ordered set of frames. The strength value for each frame is initialized to zero. Then, each frame is assessed an image sharpness value and contrast value. The image sharpness value and contrast value are added to the strength value for each frame. Each frame is assessed a noise value that is subtracted from the strength value for that frame. The frame with the highest strength value from the ordered set of frames is selected as the representative frame. In this example a frame taken at the beginning of the road race, right before the starting gun goes off, is the best representative frame since the frame captures a group of runners, ready for motion, but the frame has minimal motion compared to the other frames within the video clip of the runners in motion. The representative image selecting process determines some of the objects within the plurality of frames, such as the spectator observing the road race, are not included in the set of objects (i.e., the groups or runners running the road race) that is most common within the plurality of frames. The set of common objects is determined to represent the content of the video clip. Those objects determined not to be included in the set of objects (i.e., the groups or runners running the road race) that is most common within the plurality of frames are either deleted or ignored.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include a computer system executing a representative image selecting process that selects a frame within a video clip that best represents the content of the video clip. The representative image selecting process receives, from a user, a video clip comprised of a plurality of frames. For each of the frames with the video clip, the representative image selecting process calculates a motion vector for the frame using, for example, motion estimation technique (MET). The motion vector for each frame is calculated with respect to the two frames that are on either side of the frame within the video clip. That is, if frame number two is sandwiched between frame number one and frame number three, a motion vector is calculated for frame number two with respect to frame number one and frame number three. Frames that do not have two adjacent frames, such as the first frame and the last frame, are discarded or ignored.

Each frame is comprised of a plurality of pixels. The average magnitude of the motion vectors per pixel is calculated for each frame. The plurality of frames is ordered in descending order of the average magnitude of the motion vectors per pixel is calculated for each frame. A user determines a percentage of frames that should not be included within a set of frames that are considered to be candidates for representing the video clip as a whole. For example, the user determines that 75% of the frames, within the set of frames, should be ignored. The representative image selecting process ignores the first 75% of the plurality of frames (that are ordered in descending order of the average magnitude of the motion vectors per pixel for each frame). The frames in the remaining subset of frames (i.e., the remaining 25% of the frames with the lowest average magnitude of the motion vectors per pixel) are assessed for pictorial quality.

Pictorial quality for each frame is assessed via a strength value. The strength value for each frame is initialized to zero. Each frame is assessed an image sharpness value and contrast value. The image sharpness value and contrast value are added to the strength value for that frame. Each frame is assessed a noise value that is subtracted from the strength value for that frame. The frame with the highest strength value from the remaining subset of frames (i.e., the remaining 25% of the frames with the lowest average magnitude of the motion vectors per pixel) is selected as the representative frame. In the case of a tie between two or more frames, the frame (among the frames that are tied for strength value) that appears first within the timeline is the frame that is chosen as the representative frame.

The representative image selecting process determines a plurality of frames that are candidates to represent the set of frames. The plurality of frames is a subset of a set of frames comprising at least a portion of a video clip. The representative image selecting process calculates a motion vector for each of the frames within the plurality of frames. The motion vector indicates an amount of motion in each of the frames with respect to at least one other frame from the plurality of frames. The representative image selecting process assesses a strength value (indicating an assessment of pictorial quality of each of the frames) for each of the frames, and selects a representative frame from the plurality of frames. The representative frame is selected based on the motion vector and strength value, and indicates a most favorable representation of the plurality of frames.

Figure 1:
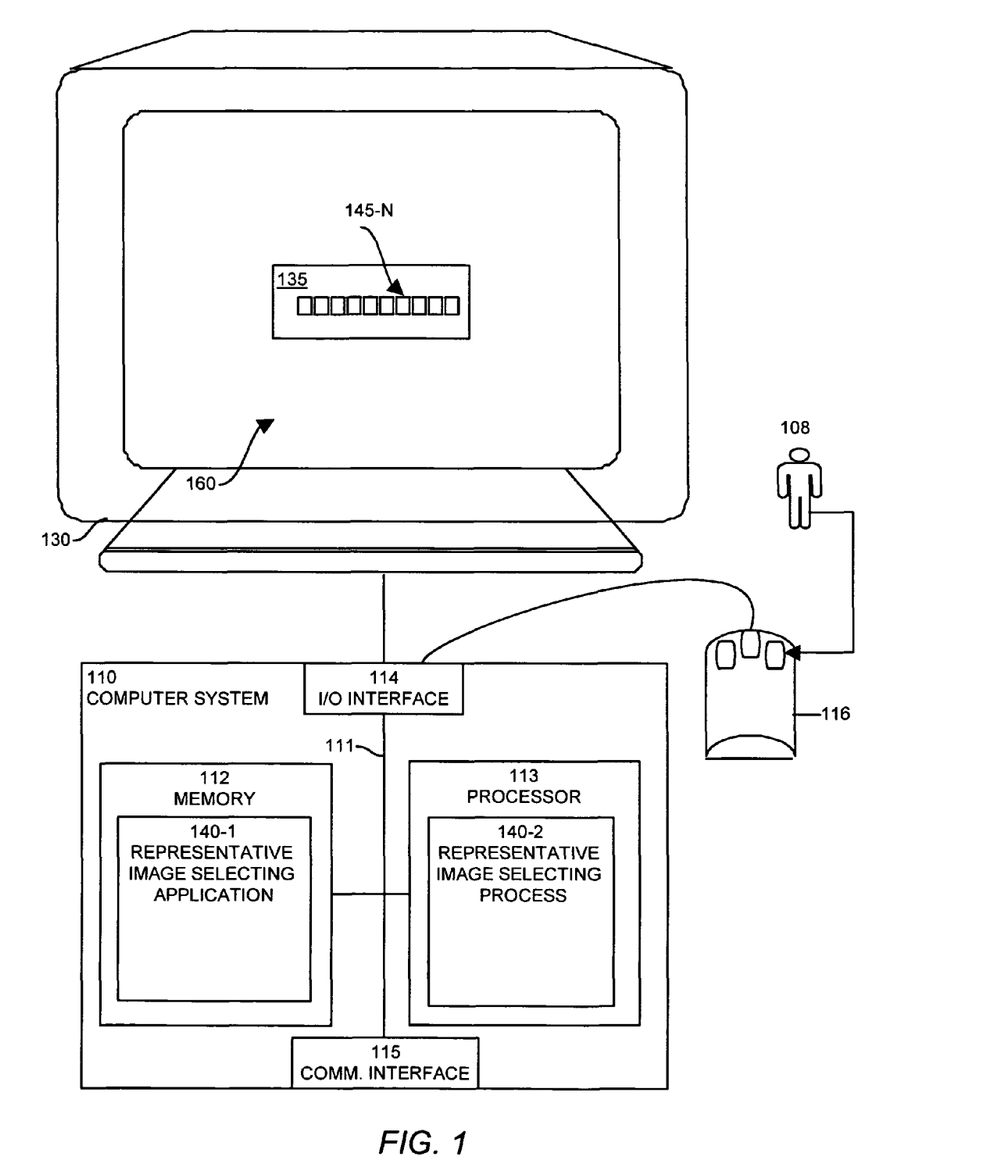
FIG. 1 shows a high level view of a document editor according to one embodiment disclosed herein.

FIG. 1 is a block diagram illustrating example architecture of a computer system 110 that executes, runs, interprets, operates or otherwise performs a representative image selecting application 140-1 and process 140-2. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, etc.) couples to processor 113 through I/O interface 114, and enables a user 108 to provide input commands and generally control the graphical user interface 160 that the representative image selecting application 140-1 and process 140-2 provides on the display 130. In this example, the graphical user interface 160 displays a video clip 135 comprised of a plurality of frames 145-N. The communications interface 115 enables the computer system 110 to communicate with other devices (i.e., other computers) on a network (not shown). This can allow access to the representative image selecting application 140-1 by remote computer systems via the communications interface 115.

The memory system 112 is any type of computer readable medium and in this example is encoded with a representative image selecting application 140-1. The representative image selecting application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the representative image selecting application 140-1. Execution of representative image selecting application 140-1 in this manner produces processing functionality in the representative image selecting process 140-2. In other words, the representative image selecting process 140-2 represents one or more portions or runtime instances of the representative image selecting application 140-1 (or the entire application 140-1) performing or executing within or upon the processor 113 in the computerized device 110 at runtime.

Figure 2:
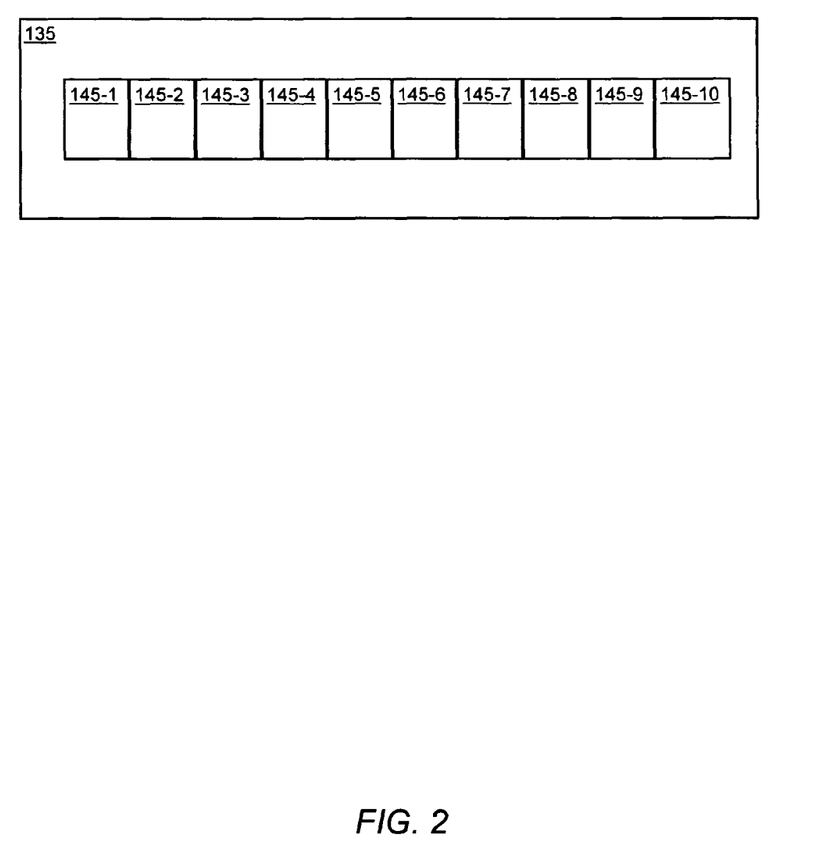
FIG. 2 illustrates a video clip comprised of a plurality of frames.

FIG. 2 illustrates a video clip 135 containing a plurality of frames 145-N. In this example, the video clip 135 contains ten frames 145-1, 145-2, 145-3, 145-4, 145-5, 145-6, 145-7, 145-8, 145-9, and 145-10.

Further details of configurations explained herein will now be provided with respect to flow charts of processing steps that show the operations disclosed herein to perform the representative image selecting process 140-2.

Figure 3:
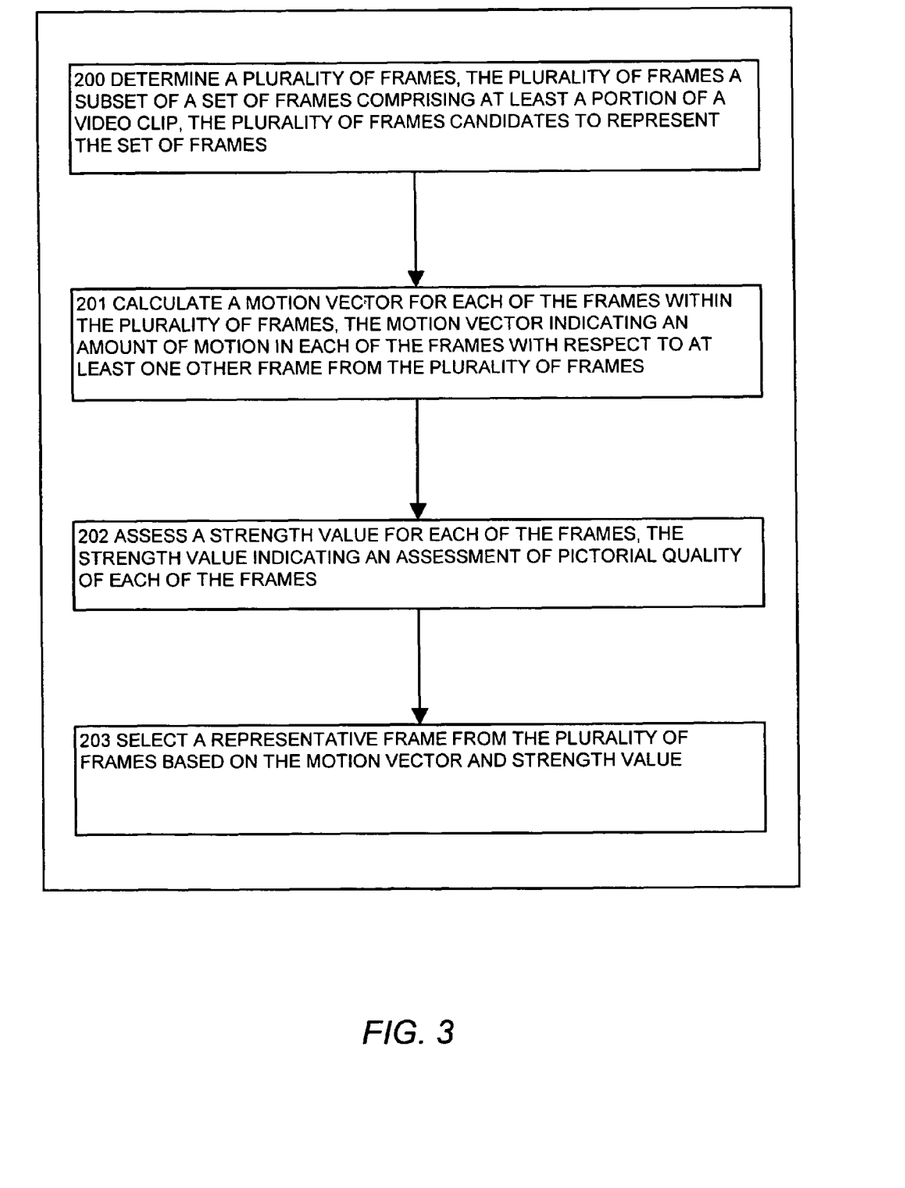
FIG. 3 illustrates a flowchart of a procedure performed by the system of FIG. 1, when the representative image selecting process determines a plurality of frames, the plurality of frames a subset of a set of frames comprising at least a portion of a video clip, the plurality of frames candidates to represent the set of frames, according to one embodiment disclosed herein.

FIG. 3 is an embodiment of the steps performed by the representative image selecting process 140-2 when it determines a plurality of frames 145-N. The plurality of frames is a subset of a set of frames comprising at least a portion of a video clip 135.

In step 200, the representative image selecting process 140-2 determines a plurality of frames 145-N. The plurality of frames is a subset of a set of frames comprising at least a portion of a video clip 135. In an example embodiment, a user 108 determines the number of frames from the video clip that comprise the plurality of frames 145-N. The frames in the plurality of frames are candidates to represent the content of the set of frames. The representative image selecting process 140-2 selects a frame from the video clip 135 that best represents the video clip 135 as a whole.

In step 201, the representative image selecting process 140-2 calculates a motion vector for each of the frames within the plurality of frames 145-N. The motion vector indicates an amount of motion in each of the frames with respect to at least one other frame from the plurality of frames 145-N. For example, a video clip of cars driving down the street would have frames that have less motion when a streetlight on the street has turned red, than the frames within the video clip when the streetlight is green.

In step 202, the representative image selecting process 140-2 assesses a strength value for each of the frames. The strength value indicates an assessment of pictorial quality of each of the frames. The plurality of frames 145-N contains frames that have differing levels of pictorial quality. For example, some frames might be blurry or have bad lighting.

In step 203, the representative image selecting process 140-2 selects a representative frame from the plurality of frames 145-N based on the motion vector and strength value for that representative frame. In an example embodiment, the representative frame indicates a most favorable representation of the plurality of frames 145-N. In other words, the representative frame is the highest pictorial quality frame that best represents the overall content of the video clip 135.

Figure 4:
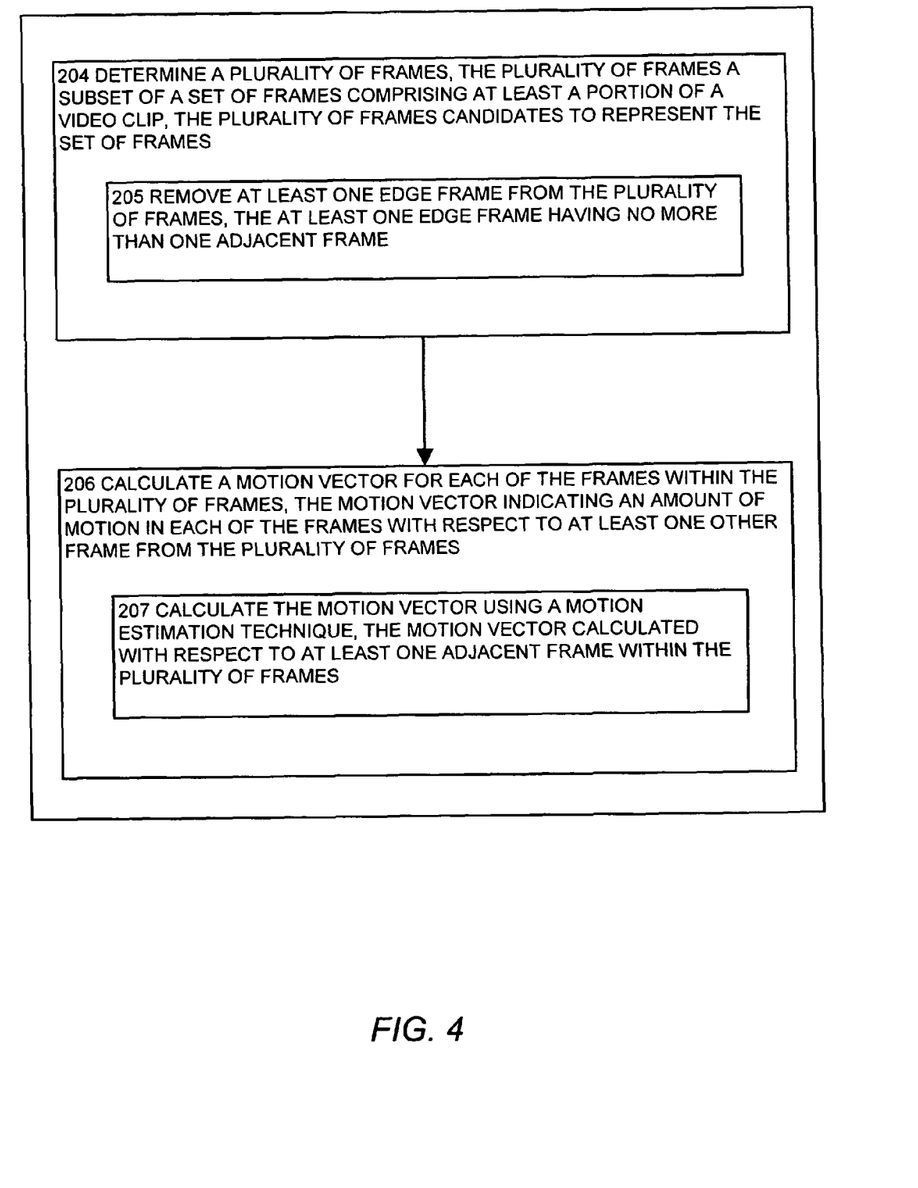
FIG. 4 illustrates a flowchart of a procedure performed by the system of FIG. 1, when the representative image selecting process determines a plurality of frames and removes at least one edge frame from the plurality of frames, according to one embodiment disclosed herein.

FIG. 4 is an embodiment of the steps performed by the representative image selecting process 140-2 when it determines a plurality of frames 145-N from a video clip 135. The best representative frame is chosen from the plurality of frames 145-N to represent the content of the video clip 135.

In step 204, the representative image selecting process 140-2 determines a plurality of frames 145-N. The plurality of frames is a subset of a set of frames comprising at least a portion of a video clip 135. The frames in the plurality of frames are candidates to represent the set of frames. The representative image selecting process 140-2 selects a frame from the video clip 135 that best represents the video clip 135 as a whole.

In step 205, the representative image selecting process 140-2 removes at least one edge frame from the plurality of frames. An edge frame is a frame having no more than one adjacent frame. For example, the first frame 145-1 and last frame 145-10 from the video clip 135 have only one adjacent frame. Thus, the representative image selecting process 140-2 removes the first frame 145-1 and the last frame 145-10 from the plurality of frames 145-N from which to select the representative frame. That is, the step of calculating a motion vector for a frame may be performed with respect to the first frame 145-1 and the last frame 145-10, but the first frame 145-1 and the last frame 145-10 are not considered to be candidates for the representative frame. For example, a motion vector is calculated on a second frame 145-2 with respect to the first frame 145-1 (and also with respect to a third frame 145-3); however, a motion vector is not calculated on the first frame 145-1 with respect to any other frame. Likewise, a motion vector is calculated on a ninth frame 145-9 with respect to the last frame 145-10 (and also with respect to an eight frame 145-8); however, a motion vector is not calculated on the last frame 145-10 with respect to any other frame.

In step 206, the representative image selecting process 140-2 calculates a motion vector for each of the frames within the plurality of frames 145-N. The motion vector indicates an amount of motion in each of the frames with respect to at least one other frame from the plurality of frames 145-N. A frame with a significant amount of motion will receive a higher motion vector value than a frame with less motion.

In step 207, the representative image selecting process 140-2 calculates the motion vector using, for example, a motion estimation technique (MET). MET is a known algorithm. The motion vector is calculated with respect to at least one adjacent frame within the plurality of frames 145-N. For example, the motion vector for frame 145-3 is calculated by determining the motion vector for frame 145-3 with respect to the motion vector calculated for frame 145-2. Then, the motion vector for frame 145-3 is calculated by determining the motion vector for frame 145-3 with respect to the motion vector calculated for frame 145-4.

Figure 5:
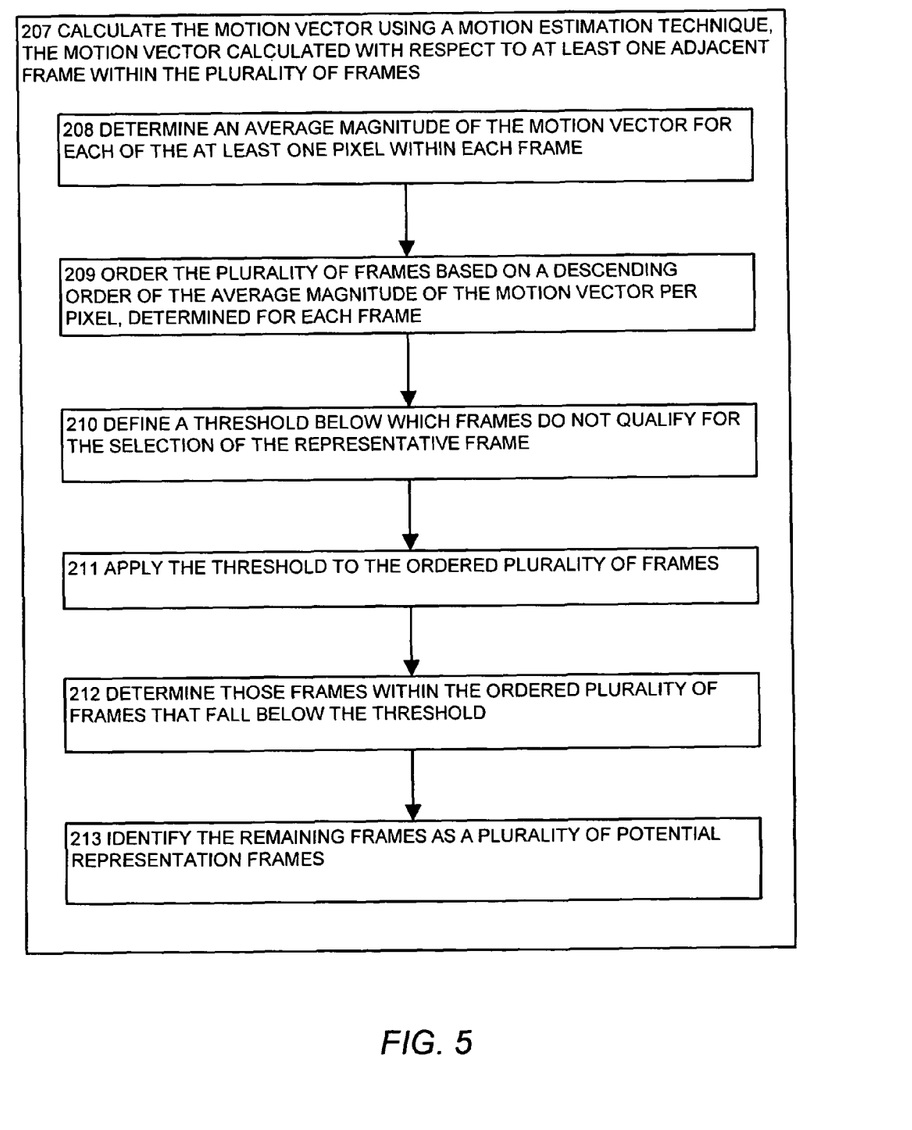
FIG. 5 illustrates a flowchart of a procedure performed by the system of FIG. 1, when the representative image selecting process calculates the motion vector using a motion estimation technique, the motion vector calculated with respect to at least one adjacent frame within the plurality of frames, according to one embodiment disclosed herein.

FIG. 5 is a continuation of an embodiment of the steps performed in FIG. 4 by the representative image selecting process 140-2 when it calculates the motion vector using, for example, a motion estimation technique (MET).

In step 208, the representative image selecting process 140-2 determines an average magnitude of the motion vector for each of the at least one pixel within each frame 145-N. Each frame 145-N is comprised of a plurality of pixels. A pixel (short for "picture element") is a single point in a graphic image. Graphics monitors display pictures by dividing the display screen into thousands (or millions) of pixels, arranged in rows and columns. The number of bits used to represent each pixel determines how many colors or shades of gray can be displayed.

In step 209, the representative image selecting process 140-2 orders the plurality of frames 145-N based on a descending order of the average magnitude determined for each frame. That is, the frames with the highest average of motion vectors per pixel (meaning those frames with the most movement) are listed first, and the frames with the lowest average of motion vectors per pixel (meaning those frames with the least movement) are listed last.

In step 210, the representative image selecting process 140-2 defines a threshold below which frames do not qualify for the selection of the representative frame. In an example embodiment, the threshold is a percentage between 0% and 100%, and is provided by the user 108.

In step 211, the representative image selecting process 140-2 applies the threshold to the ordered plurality of frames 145-N. For example, the user 108 defines the threshold to be 25%. The video clip 135 is comprised of ten frames 145-N. The first frame 145-1 and last frame 145-10 are ignored because the first frame 145-1 and last frame 145-10 have only one adjacent frame. The motion vector is calculated for the remaining eight frames (145-2, 145-3, 145-4, 145-5, 145-6, 145-7, 145-8, 145-9), and the remaining eight frames are ordered in descending order of the average magnitude determined for each frame, for example, 145-3, 145-8, 145-4, 145-6, 145-5, 145-2, 145-9, 145-7. The user 108 defines the threshold to be 25%. The representative image selecting process 140-2 applies the 25% threshold to the ordered plurality of frames 145-3, 145-8, 145-4, 145-6, 145-5, 145-2, 145-9, 145-7.

In step 212, the representative image selecting process 140-2 determines those frames within the ordered plurality of frames that fall below the threshold. For the ordered plurality of frames 145-3, 145-8, 145-4, 145-6, 145-5, 145-2, 145-9, 145-7, frame 145-3 and 145-8 fall below the 25% threshold provided by the user 108.

In step 213, the representative image selecting process 140-2 identifies the remaining frames 145-N as a plurality of potential representation frames. The frames within the ordered plurality of remaining frames 145-4, 145-6, 145-5, 145-2, 145-9, 145-7 are candidates to be selected as the representative frame.

Figure 6:
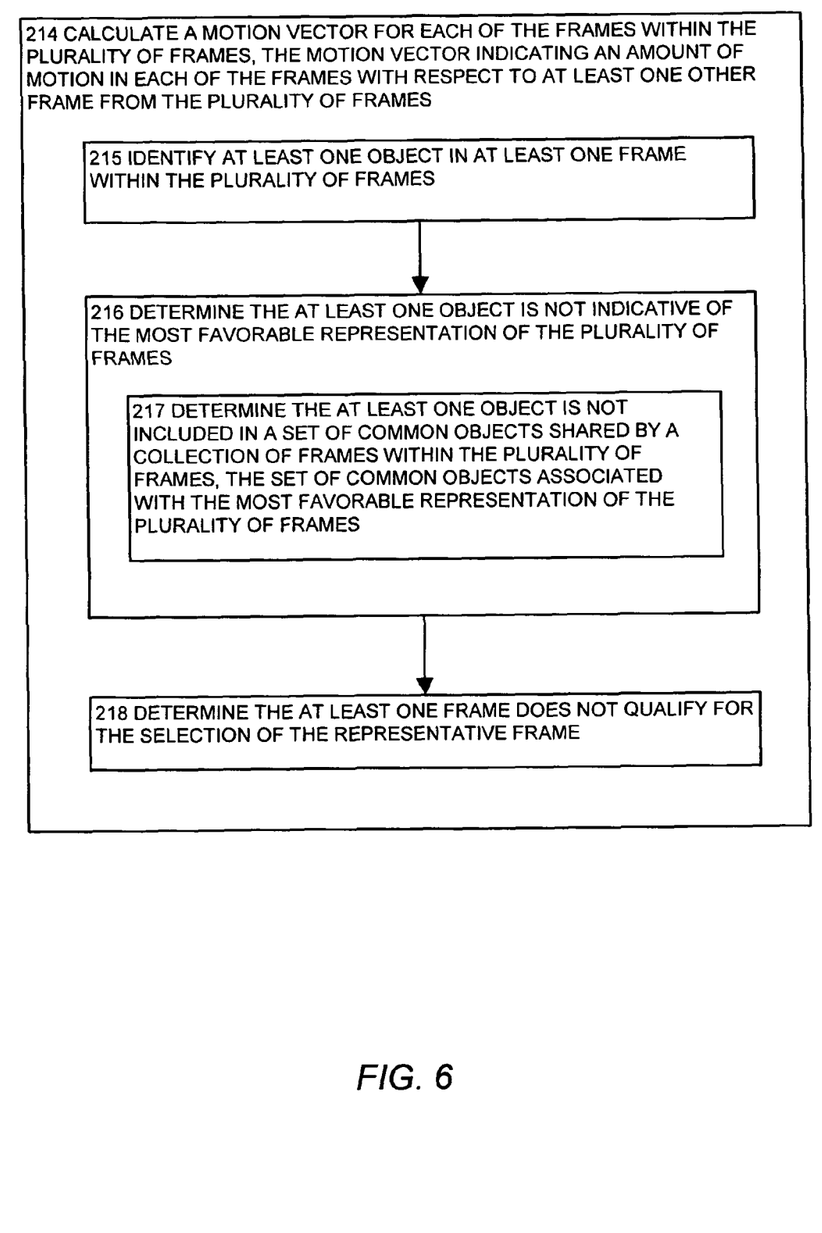
FIG. 6 illustrates a flowchart of a procedure performed by the system of FIG. 1, when the representative image selecting process calculates the motion vector using a motion estimation technique, and identifies at least one object in at least one frame within the plurality of frames, according to one embodiment disclosed herein.

FIG. 6 is an embodiment of the steps performed by the representative image selecting process 140-2 when it calculates a motion vector for each of the frames within the plurality of frames 145-N.

In step 214, the representative image selecting process 140-2 calculates a motion vector for each of the frames within the plurality of frames 145-N. The motion vector indicates an amount of motion in each of the frames with respect to at least one other frame from the plurality of frames 145-N. In an example embodiment, the motion vector is calculated, for example, using Motion Estimation Technique (MET), a known algorithm.

In step 215, the representative image selecting process 140-2 identifies at least one object in at least one frame 145-2 within the plurality of frames 145-N. In an example embodiment, the video clip 135 is footage of a road race. The majority of frames 145-N within the video clip 135 show participants running the road race. Some of the frames 145-N within the video clip 135 show spectators cheering on the runners. While the frames 145-N within the video clip 135 that display spectators cheering on the runners may have less motion than the frames 145-N within the video clip 135 displaying participants running the road race, the content of the video clip 135 is best represented by the participants of the road race, not the spectators. The representative image selecting process 140-2 identifies at least one object in at least one frame 145-2 within the plurality of frames 145-N as being a spectator observing the road race. The frame 145-2 may have a very low motion vector value (meaning there is very little motion in the frame 145-2).

In step 216, the representative image selecting process 140-2 determines the object is not indicative of the most favorable representation of the plurality of frames 145-N. The representative image selecting process 140-2 determines that while the object (i.e., the spectator observing the road race) in the frame 145-2 has a low motion vector value, it is not representative of the content of the video clip 135. That is, frame 145-2, containing a spectator, does not represent the road race as well as other frames 145-N that display runners running the road race.

In step 217, the representative image selecting process 140-2 determines the object is not included in a set of common objects shared by a collection of frames within the plurality of frames 145-N. The set of common objects is associated with the most favorable representation of the plurality of frames 145-N. The representative image selecting process 140-2 determines the object (i.e., the spectator observing the road race) is not included in the set of objects (i.e., the groups or runners running the road race) that is most common within the plurality of frames 145-N. The set of common objects is determined to represent the content of the video clip 135.

In step 218, the representative image selecting process 140-2 determines the frame 145-2 (containing the spectator of the road race) does not qualify for the selection of the representative frame. The representative image selecting process 140-2 determines the most common set of objects within the plurality of frames 145-N is group of runners running the road race. Thus, the representative image selecting process 140-2 determines that, while the frame 145-2 of the spectator observing the road race has a low motion vector value, that frame 145-2, does not truly represent the majority of content within the video clip 135. Thus, the representative image selecting process 140-2 determines the frame 145-2 is not a good candidate for the representative frame, and removes it from the set of the ordered plurality of remaining frames 145-4, 145-6, 145-5, 145-9, 145-7.

Figure 7:
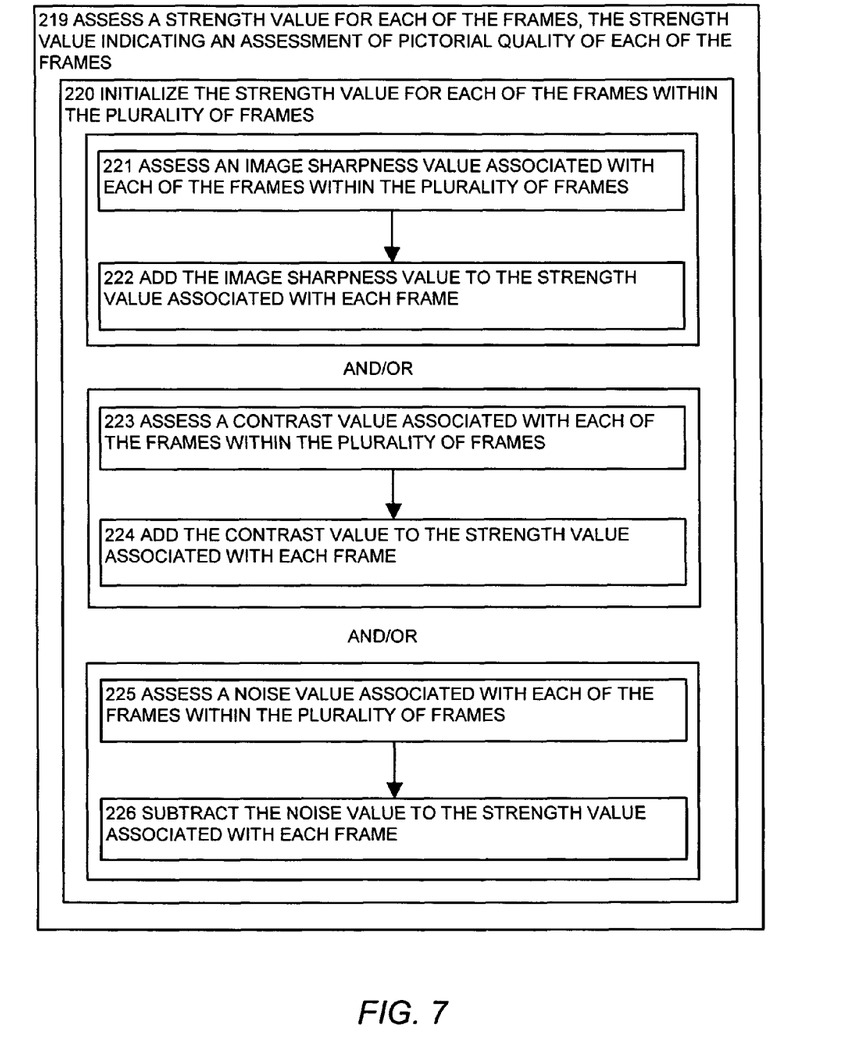
FIG. 7 illustrates a flowchart of a procedure performed by the system of FIG. 1, when the representative image selecting process assesses a strength value for each of the frames, the strength value indicating an assessment of pictorial quality of each of the frames, according to one embodiment disclosed herein.

FIG. 7 is an embodiment of the steps performed by the representative image selecting process 140-2 when it assesses a strength value (indicating pictorial quality) for each of the frames 145-N.

In step 219, the representative image selecting process 140-2 assesses a strength value for each of the frames 145-N. The strength value indicates an assessment of pictorial quality of each of the frames 145-N. A frame 145-N that is assessed to have a low motion vector value (meaning little motion in the frame 145-N) and has been determined to contain content that is representative of the video clip 135, is not a good candidate as the representative frame if the frame 145-N is blurry or has bad lighting. Thus, the representative image selecting process 140-2 assesses a strength value for each of the frames 145-N frames. In one embodiment, the representative image selecting process 140-2 assesses a strength value for each of the frames 145-N within the video clip 135. In another example embodiment, the representative image selecting process 140-2 assesses a strength value for each of the frames 145-N within the ordered plurality of remaining frames 145-4, 145-6, 145-5, 145-9, 145-7 as described in sub step 218.

In step 220, the representative image selecting process 140-2 initializes the strength value for each of the frames within the plurality of frames 145-N. In an example embodiment, the strength value is initialized to zero for each of the frames within the plurality of frames 145-N.

In step 221, the representative image selecting process 140-2 assesses an image sharpness value associated with each of the frames within the plurality of frames 145-N.

In step 222, the representative image selecting process 140-2 adds the image sharpness value to the strength value associated with each frame 145-N. In an example embodiment, image sharpness can comprise image definition and image resolution.

In step 223, the representative image selecting process 140-2 assesses a contrast value associated with each of the frames within the plurality of frames 145-N. Image contrast can be defined as the difference in tone between light and dark areas of the image.

In step 224, the representative image selecting process 140-2 adds the contrast value to the strength value associated with each frame 145-N. In an example embodiment, the image sharpness value and contrast value are both added to the strength value of the frame 145-N.

In step 225, the representative image selecting process 140-2 assesses a noise value associated with each of the frames within the plurality of frames 145-N. Image noise can create specks of the wrong color in a digital image. Image noise can occur, for example, in low-light conditions when a camera's light sensor registers an incorrect value, for instance, recording yellow when the light sensor should record black In step 226, the representative image selecting process 140-2 subtracts the noise value to the strength value associated with each frame 145. In an example embodiment, the image sharpness value and contrast value are both added to the strength value of the frame 145-N, and the noise value is subtracted from the overall strength value of the frame 145-N.

Figure 8:
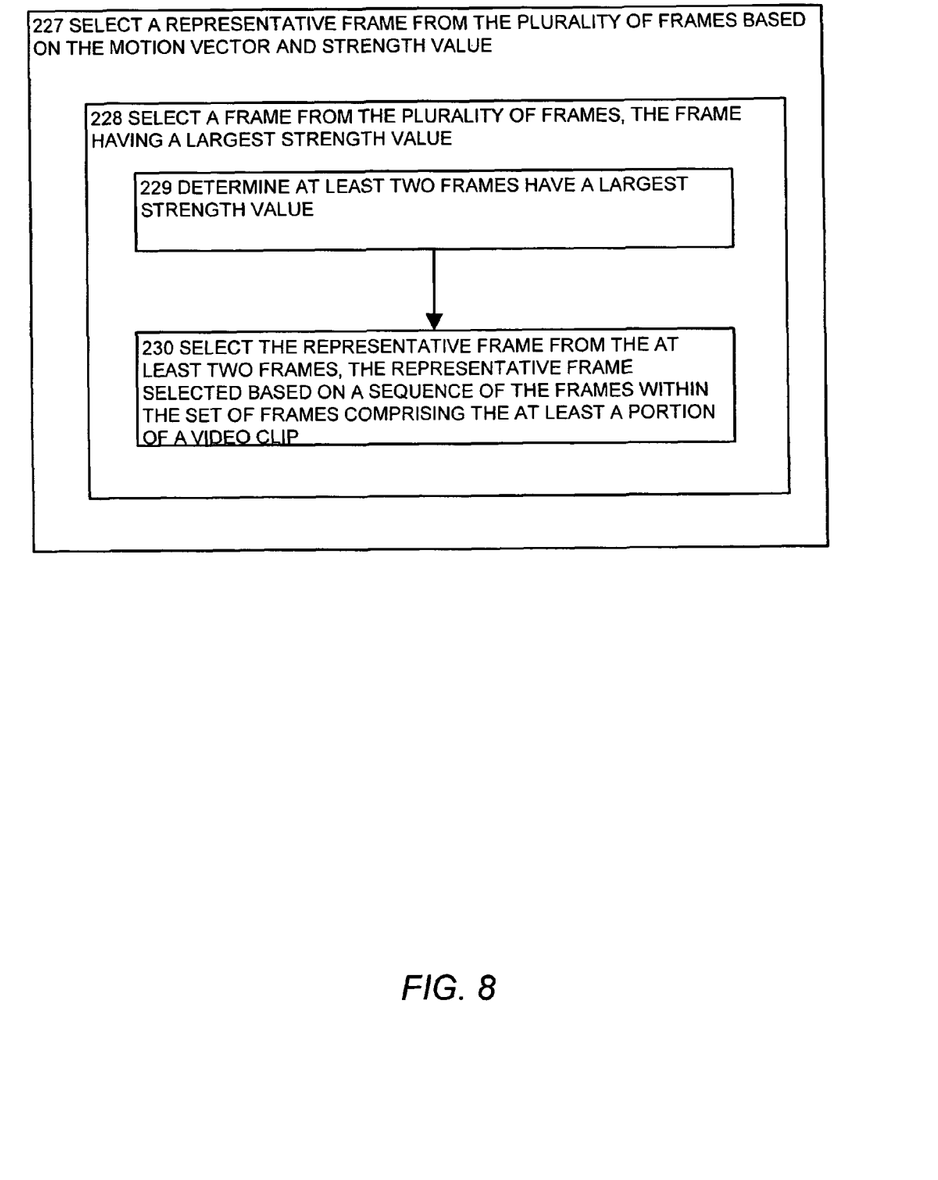
FIG. 8 illustrates a flowchart of a procedure performed by the system of FIG. 1, when the representative image selecting process selects a representative frame from the plurality of frames based on the motion vector and strength value, the representative frame indicating a most favorable representation of the plurality of frames, according to one embodiment disclosed herein.

FIG. 8 is an embodiment of the steps performed by the representative image selecting process 140-2 when it selects a representative frame from the plurality of frames 145-N based on the motion vector and strength value.

In step 227, the representative image selecting process 140-2 selects a representative frame from the plurality of frames 145-N based on the motion vector and strength value. In an example embodiment, the representative frame indicates a most favorable representation of the plurality of frames 145-N. In other words, the representative frame is the frame that best represents the overall content of the video clip 135 and is the best choice as the 'poster image' of the video clip 135.

In step 228, the representative image selecting process 140-2 selects a frame 145-5 from the plurality of frames 145-N. The selected frame 145-5 has the largest strength value. In an example embodiment, the selected frame 145-5 was selected from the plurality of frames 145-N that comprise the video clip 135. In another example embodiment, the selected frame 145-5 was selected from the ordered plurality of remaining frames 145-4, 145-6, 145-5, 145-9, 145-7 as described in sub step 218. In other words, the plurality of frames 145-N that comprise the video clip 135 are ordered in descending motion vector value. Those frames 145-N that do not have at least two adjacent frames are discarded, as are any frames 145-N that contain objects not determined to be commonly shared objects contained within the plurality of frames 145-N that comprise the video clip 135.

In step 229, the representative image selecting process 140-2 determines at least two frames 145-5 and 145-6 have a largest strength value. In an example embodiment, the representative image selecting process 140-2 determines frame 145-5 and frame 145-6 have the same strength value and are tied for selection of the representative frame.

In step 230, the representative image selecting process 140-2 selects the representative frame from at least two frames 145-N. The representative frame is selected based on a sequence of the frames within the set of frames comprising at least a portion of a video clip 135. The representative image selecting process 140-2 breaks the tie by selecting the frames 145-5 that appears first in the sequence of frames 145-N within the video clip 135.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A method in a computerized device, the method comprising:
   determining a plurality of frames, the plurality of frames a subset of a set of frames comprising at least a portion of a video clip, the plurality of frames candidates to represent the set of frames;
   calculating a motion vector for each of the frames within the plurality of frames, the motion vector indicating an amount of motion in each of the frames with respect to at least one other frame from the plurality of frames;
   assessing a strength value for each of the frames, the strength value indicating an assessment of pictorial quality of each of the frames; and
   selecting a representative frame from the plurality of frames based on the motion vector and strength value.

2. The method of claim 1 wherein determining a plurality of frames comprises:
   removing at least one edge frame from the plurality of frames, the at least one edge frame having no more than one adjacent frame.

3. The method of claim 1 wherein calculating a motion vector for each of the frames within the plurality of frames comprises:
   calculating the motion vector using a motion estimation technique, the motion vector calculated with respect to at least one adjacent frame within the plurality of frames.

4. The method of claim 3 wherein each frame comprises at least one pixel, and wherein calculating the motion vector using a motion estimation technique comprises:
   determining an average magnitude of the motion vector for each of the at least one pixel within each frame.

5. The method of claim 4 comprising:
   ordering the plurality of frames based on a descending order of the average magnitude determined for each frame;
   defining a threshold below which frames do not qualify for the selection of the representative frame;
   applying the threshold to the ordered plurality of frames;
   determining those frames within the ordered plurality of frames that fall below the threshold; and
   identifying the remaining frames as a plurality of potential representation frames.

6. The method of claim 1 wherein calculating a motion vector for each of the frames within the plurality of frames comprises:
   identifying at least one object in at least one frame within the plurality of frames;
   determining the at least one object is not indicative of the most favorable representation of the plurality of frames; and
   determining the at least one frame does not qualify for the selection of the representative frame.

7. The method of claim 6 wherein determining the at least one object is not indicative of the most favorable representation of the plurality of frames comprises:
   determining the at least one object is not included in a set of common objects shared by a collection of frames within the plurality of frames, the set of common objects associated with the most favorable representation of the plurality of frames.

8. The method of claim 1 wherein assessing a strength value for each of the frames comprises:
   initializing the strength value for each of the frames within the plurality of frames.

9. The method of claim 8 comprising:
   assessing an image sharpness value associated with each of the frames within the plurality of frames; and
   adding the image sharpness value to the strength value associated with each frame.

10. The method of claim 8 comprising:
    assessing a contrast value associated with each of the frames within the plurality of frames; and
    adding the contrast value to the strength value associated with each frame.

11. The method of claim 8 comprising:
    assessing a noise value associated with each of the frames within the plurality of frames; and
    subtracting the noise value from the strength value associated with each frame.

12. The method of claim 1 wherein selecting a representative frame from the plurality of frames based on the motion vector and strength value comprises:
    selecting a frame from the plurality of frames, the frame having a largest strength value.

13. The method of claim 12 wherein selecting a frame from the plurality of frames comprises:
    determining at least two frames have a largest strength value;
    selecting the representative frame from the at least two frames, the representative frame selected based on a sequence of the frames within the set of frames comprising the at least a portion of a video clip.

14. A computerized device comprising:
    a memory;
    a processor;
    a communications interface;
    an interconnection mechanism coupling the memory, the processor and the communications interface;
    wherein the memory is encoded with a representative image selecting application that when executed on the processor is capable of generating a panel on the computerized device by performing the operations of:

determining a plurality of frames, the plurality of frames a subset of a set of frames comprising at least a portion of a video clip, the plurality of frames candidates to represent the set of frames;

calculating a motion vector for each of the frames within the plurality of frames, the motion vector indicating an amount of motion in each of the frames with respect to at least one other frame from the plurality of frames;

assessing a strength value for each of the frames, the strength value indicating an assessment of pictorial quality of each of the frames; and selecting a representative frame from the plurality of frames based on the motion vector and strength value.

15. The computerized device of claim 14 wherein when the computerized device performs the operation of calculating a motion vector for each of the frames within the plurality of frames, the computerized device is capable of performing the operation of:

calculating the motion vector using a motion estimation technique, the motion vector calculated with respect to at least one adjacent frame within the plurality of frames.

16. The computerized device of claim 15 wherein each frame comprises at least one pixel, and wherein when the computerized device performs the operation of calculating the motion vector using a motion estimation technique, the computerized device is capable of performing the operation of:

determining an average magnitude of the motion vector for each of the at least one pixel within each frame.

17. The computerized device of claim 16 wherein the computerized device is capable of performing the operation of:

ordering the plurality of frames based on a descending order of the average magnitude determined for each frame;

defining a threshold below which frames do not qualify for the selection of the representative frame;

applying the threshold to the ordered plurality of frames;

determining those frames within the ordered plurality of frames that fall below the threshold; and identifying the remaining frames as a plurality of potential representation frames.

18. The computerized device of claim 14 wherein when the computerized device performs the operation of assessing a strength value for each of the frames, the computerized device is capable of performing the operation of:

initializing the strength value for each of the frames within the plurality of frames.

19. The computerized device of claim 14 wherein when the computerized device performs the operation of selecting a representative frame from the plurality of frames based on the motion vector and strength value, the computerized device is capable of performing the operation of:

selecting a frame from the plurality of frames, the frame having a largest strength value.

20. A computer readable medium encoded with computer programming logic that when executed on a process in a computerized device provides representative image selecting, the medium comprising:

instructions for determining a plurality of frames, the plurality of frames a subset of a set of frames comprising at least a portion of a video clip, the plurality of frames candidates to represent the set of frames;

instructions for calculating a motion vector for each of the frames within the plurality of frames, the motion vector indicating an amount of motion in each of the frames with respect to at least one other frame from the plurality of frames;

instructions for assessing a strength value for each of the frames, the strength value indicating an assessment of pictorial quality of each of the frames; and instructions for selecting a representative frame from the plurality of frames based on the motion vector and strength value.

* * * * *